(12) United States Patent
Crites et al.

(10) Patent No.: US 8,676,646 B2
(45) Date of Patent: *Mar. 18, 2014

(54) RESPONSE ATTRIBUTION VALUATION

(75) Inventors: Robert Crites, Mechanicsburg, PA (US); Ruby Kennedy, Bedford, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/558,095

(22) Filed: Jul. 25, 2012

(65) Prior Publication Data

US 2012/0290371 A1    Nov. 15, 2012

Related U.S. Application Data

(63) Continuation of application No. 12/941,638, filed on Nov. 8, 2010.

(51) Int. Cl.
G06Q 30/00    (2012.01)

(52) U.S. Cl.
USPC ..................................................... 705/14.52

(58) Field of Classification Search
USPC ..................................................... 705/14.52
See application file for complete search history.

(56) References Cited

U.S. PATENT DOCUMENTS

| | | |
|---|---|---|
| 5,664,171 A | 9/1997 | Agrawal et al. |
| 5,765,154 A | 6/1998 | Horikiri et al. |
| 5,822,751 A | 10/1998 | Gray et al. |
| 5,883,940 A | 3/1999 | Thornton |
| 5,899,988 A | 5/1999 | Depledge et al. |
| 5,930,764 A | 7/1999 | Melchione et al. |
| 5,966,695 A | 10/1999 | Melchione et al. |
| 5,974,407 A | 10/1999 | Sacks |
| 6,061,658 A | 5/2000 | Chou et al. |
| 6,067,525 A | 5/2000 | Johnson et al. |
| 6,076,068 A | 6/2000 | DeLapa et al. |
| 6,078,892 A | 6/2000 | Anderson et al. |
| 6,097,792 A | 8/2000 | Thornton |
| 6,134,530 A | 10/2000 | Bunting et al. |
| 6,160,549 A | 12/2000 | Touma et al. |
| 6,161,103 A | 12/2000 | Rauer et al. |
| 6,263,334 B1 | 7/2001 | Fayyad et al. |
| 6,321,241 B1 | 11/2001 | Gartung et al. |
| 6,493,708 B1 | 12/2002 | Ziauddin et al. |
| 6,539,232 B2 | 3/2003 | Hendrey et al. |
| 6,567,786 B1 | 5/2003 | Bibelnieks et al. |
| 6,606,621 B2 | 8/2003 | Hopeman et al. |
| 6,684,207 B1 | 1/2004 | Greenfield et al. |

(Continued)

OTHER PUBLICATIONS

Non-Patent Literature: Fair, Walt. "An Algorithm for Weighted Linear Regression." Code Project. Code Project, Apr. 17, 2008. Web. Oct. 13, 2012. <http://www.codeproject.com/Articles/25335/An-Algorithm-for-Weighted-Linear-Regression>.*

(Continued)

Primary Examiner — John G Weiss
Assistant Examiner — Dipen Patel
(74) Attorney, Agent, or Firm — Cuenot, Forsythe & Kim, LLC

(57) ABSTRACT

A computer-implemented method is described for determining a response attribution value that represents a credit assignment to a communication, for an associated response received from a recipient during a marketing campaign.

10 Claims, 7 Drawing Sheets

(56) References Cited

U.S. PATENT DOCUMENTS

| | | | |
|---|---|---|---|
| 6,691,120 | B1 | 2/2004 | Durrant et al. |
| 6,694,316 | B1 | 2/2004 | Langseth et al. |
| 6,782,390 | B2 | 8/2004 | Lee et al. |
| 6,847,934 | B1 | 1/2005 | Lin et al. |
| 6,868,389 | B1 | 3/2005 | Wilkins et al. |
| 6,915,289 | B1 | 7/2005 | Malloy et al. |
| 6,917,940 | B1 | 7/2005 | Chen et al. |
| 6,959,305 | B2 | 10/2005 | Bird et al. |
| 7,158,943 | B2 | 1/2007 | van der Riet |
| 7,852,940 | B2 * | 12/2010 | Malayath ............... 375/240.16 |
| 7,885,803 | B2 * | 2/2011 | Nuzman et al. ............... 703/21 |
| 8,175,830 | B2 | 5/2012 | Hosking |
| 8,178,503 | B2 * | 5/2012 | Rigoutsos et al. ........ 514/44 A |
| 8,473,343 | B2 | 6/2013 | Chalimadugu et al. |
| 2001/0014868 | A1 | 8/2001 | Herz et al. |
| 2002/0026356 | A1 | 2/2002 | Bergh et al. |
| 2002/0042738 | A1 | 4/2002 | Srinivasan et al. |
| 2002/0046116 | A1 | 4/2002 | Hohle et al. |
| 2002/0147639 | A1 | 10/2002 | Williams et al. |
| 2002/0169654 | A1 | 11/2002 | Santos et al. |
| 2003/0009467 | A1 | 1/2003 | Perrizo |
| 2003/0083924 | A1 | 5/2003 | Lee et al. |
| 2003/0110119 | A1 | 6/2003 | Crites |
| 2003/0115207 | A1 | 6/2003 | Bowman et al. |
| 2003/0130883 | A1 | 7/2003 | Schroeder et al. |
| 2003/0135442 | A1 | 7/2003 | Kumar et al. |
| 2003/0144873 | A1 | 7/2003 | Keshel |
| 2003/0187767 | A1 | 10/2003 | Crites et al. |
| 2003/0208402 | A1 | 11/2003 | Bibelnieks et al. |
| 2004/0133487 | A1 | 7/2004 | Hanagan et al. |
| 2004/0225562 | A1 | 11/2004 | Turner |
| 2004/0254860 | A1 | 12/2004 | Wagner et al. |
| 2005/0197899 | A1 | 9/2005 | Veit et al. |
| 2005/0216525 | A1 | 9/2005 | Wachholz-Prill et al. |
| 2005/0289000 | A1 | 12/2005 | Chiang et al. |
| 2006/0085246 | A1 | 4/2006 | Lin et al. |
| 2006/0095321 | A1 | 5/2006 | Shi et al. |
| 2007/0143186 | A1 | 6/2007 | Apple et al. |
| 2007/0150334 | A1 | 6/2007 | Bergh et al. |
| 2008/0021909 | A1 * | 1/2008 | Black et al. ................. 707/100 |
| 2008/0033784 | A1 * | 2/2008 | Chalimadugu et al. ........ 705/10 |
| 2008/0033807 | A1 | 2/2008 | Black et al. |
| 2008/0033808 | A1 * | 2/2008 | Black et al. ..................... 705/14 |
| 2008/0033809 | A1 | 2/2008 | Black et al. |
| 2008/0126146 | A1 | 5/2008 | Benveniste et al. |
| 2008/0281627 | A1 * | 11/2008 | Chang et al. ..................... 705/1 |
| 2009/0210290 | A1 | 8/2009 | Elliott et al. |
| 2011/0307328 | A1 | 12/2011 | Crites et al. |
| 2012/0116787 | A1 | 5/2012 | Crites et al. |
| 2012/0290385 | A1 | 11/2012 | Crites et al. |

OTHER PUBLICATIONS

Griggs, "Give us leads! Give us leads!" Sales and Marketing Management, Jul. 1997 vol. 149, No. 7, pp. 66-72.

McGinnis, et al., "Strategic account management in the new procurement environment," Supply Chain Management, Bradford vol. 3, No. 1, pp. 12-16, 1998.

"General Interactive Teams up with IBM to Deliver Industries Best E-Business and Relationship Marketing Solutions," Business/Technology Editors, Business Wire, May 3, 1999.

"Microsoft Announces Internet Lead Management Platform," Microsoft News Center, Jan. 24, 2000, retrieved from the Internet: <www.microsoft.com/en-us/news/press/2000/jan00/platformpr.aspx>.

Bradway, B., "Data Mining Solutions and Customer Management," Meridien Research, Inc., Dec. 1997.

Godwin, "Predictor of Households' Debt Repayment Difficulties," Assoc. for Financial Counseling and Planning Education, pp. 67-78, 1999.

Boyes, et al., "Lender Reactions to Information Restrictions: The Case of Banks and the ECOA," Journal of Money, Credit and Banking, vol. 18, No. 2, pp. 211-219, 1986.

Chou, et al., "Identifying Prospective Customers," ACM Digital Library, Proc. of the 6th ACM SIGKDD Int' Conf. on Knowledge Discovery and Data Mining, pp. 447-456, 2000.

Hernandez-Sherrington, et al., "A Generalization of Band Joins and the Merger/Purge Problem," Columbia University, Ph.D. Thesis, pp. i-171, 1996.

Raab, "Unica Impact!" DM News, Sep. 1999, retrieved from the Internet: <http://www.raabassociates.com/a909unic.htm>.

"Leading Customer-Focused Corporations Join Unica TM Advisory Board," BusinessWire, pp. 1-2, Nov. 6, 2000.

"Lands' End to Automate Marketing Processes with Unica Corporation's Affinium," BusinessWire, pp. 1-2, Sep. 12, 2000.

"Product Review 'Affinium Campaign'—Affinium Campaign Enables MITI to Create Complex Campaigns Across Diverse Databases," DM Review, p. 1, May 2000.

"Workflow and Internet: Catalysts for Radical Change," Workflow Management Coalition, Jun. 1998, pp. 1-32.

Fair, W., "An Algorithm for Weighted Linear Regression," [Online] Code Project, Apr. 17, 2008, retrieved from the Internet: <http://www.codeproject.com/Articles/25335/An-Algorithm-for-Weighted-Linear-Regression>, 7 pgs.

Johansen, A., "Probing Human Response Times," Physica A: Statistical Mechanics and its Applications 338, No. 1, pp. 286-291, 2004.

* cited by examiner

RESPONSE ATTRIBUTION VALUATION

CROSS-REFERENCE to RELATED APPLICATIONS

This application is a Continuation of U.S. application Ser. No. 12/941,638, filed on Nov. 8, 2010.

BACKGROUND

In marketing of products/services and so forth, communications are made from one entity to another entity. Promotions, which are one type of communication, often elicit various responses from the entity receiving the communication, e.g., promotion. Responses can include visiting a web site, requesting information, or purchasing a product, and so forth. Many companies use predictive modeling techniques (e.g., response models and valuation models) to forecast customer responses given some prior promotion.

Additionally, when an entity responds to a promotion, the entity may provide non-identifying or identifying, e.g., unique information identifying the promotion to which the entity is responding. Based on the information, "direct response attribution" is determined. Response attribution (e.g., direct response attribution and inferred response attribution) refers to a number of responses (e.g., a number of purchases of a television) caused by a particular promotion (e.g., an e-mail advertisement). Because in direct response attribution, each response is commonly associated with information identifying the promotion to which the entity is responding, a marketer can easily determine the promotions that precipitated particular responses.

SUMMARY

One or more aspects of the present disclosure may provide one or more of the following advantages. Inferred response attribution determines how multiple promotions across marketing campaigns contribute to a response. Given a number of responses and promotions, each promotion and each response are joined in a "response-promotion pair." For each response-promotion pair, a response attribution value, indicative of an amount of credit attributed to the promotion for the response, is generated. The response attribution value provides a marketer with information indicative of how effective a particular promotion was in eliciting a particular response.

In one aspect of the present disclosure, a computer-implemented method for determining a response attribution value that represents a credit assignment to a communication, for a response received from a recipient during a marketing campaign, includes retrieving by one or more computer systems a value for a response rate parameter associated with the communication and a value for a time delay distribution parameter associated with the response received from the recipient; generating by the one or more computer systems a response attribution value according to the retrieved value for the response rate parameter and the retrieved value for the time delay distribution parameter; calculating by the one or more computer systems a subsequent value for the response rate parameter; and calculating by the one or more computer systems a subsequent value for the time delay distribution parameter by applying the generated response attribution value and a time delay distribution to a regression model.

Implementations of the disclosure may include one or more of the following features. In some implementations, the method also includes retrieving by the one or more computer systems the subsequent values for the response rate parameter and the time delay distribution parameter; and generating by the one or more computer systems a subsequent response attribution value according to the retrieved subsequent value for the response rate parameter and the retrieved subsequent value for the time delay distribution parameter. The method may also include iteratively, retrieving the subsequent values for the response rate parameter and the time delay distribution parameter and generating the subsequent response attribution value according to the retrieved subsequent value of the response rate parameter and the retrieved subsequent value of the time delay distribution parameter.

In other implementations, the method includes terminating generation of the response attribution value when the calculated values of the response rate and time delay distribution parameters converge. The method may also include terminating generation of the response attribution value when a threshold number of iterations of generating have occurred. The method may additionally include terminating generation of the response attribution value when a threshold amount of computing resources have been expended.

In still other implementations, the retrieved values for the response rate and time delay distribution parameters are arbitrarily provided values. The method may also include outputting from the one or more computers an identifier corresponding to the communication and associated response, and the determined response attribution value. In some implementations, the regression model is selected from a group including weighted regressions, linear regressions, quadratic regressions, polynomial regressions, spline function models, and sinusoid models.

In still another aspect of the disclosure, a computer program product is embodied on a computer readable storage medium, the computer program product including instructions for causing a computer to: retrieve a value for a response rate parameter associated with the communication and a value for a time delay distribution parameter associated with a response received from a recipient of a marketing communication; generate a response attribution value according to the retrieved value for the response rate parameter and the retrieved value for the time delay distribution parameter; calculate a subsequent value for the response rate parameter; and calculate a subsequent value for the time delay distribution parameter by applying the generated response attribution value and a time delay distribution to a regression model. Implementations of this aspect of the present disclosure can include one or more of the foregoing features.

In yet another aspect of the disclosure, an apparatus includes a processor; and a computer program product embodied on a computer readable storage medium, the computer program product including instructions for causing the processor to: retrieve a value for a response rate parameter associated with the communication and a value for a time delay distribution parameter associated with a response received from a recipient of a marketing communication; generate a response attribution value according to the retrieved value for the response rate parameter and the retrieved value for the time delay distribution parameter; calculate a subsequent value for the response rate parameter; and calculate a subsequent value for the time delay distribution parameter by applying the generated response attribution value and a time delay distribution to a regression model. Implementations of this aspect of the present disclosure can include one or more of the foregoing features.

All or part of the foregoing may be implemented as a computer program product including instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The details of one or more embodiments are set forth in the accompanying drawings and the description below. Other features, objects, and advantages will be apparent from the description and drawings, and from the claims.

DETAILED DESCRIPTION

Figure 1:
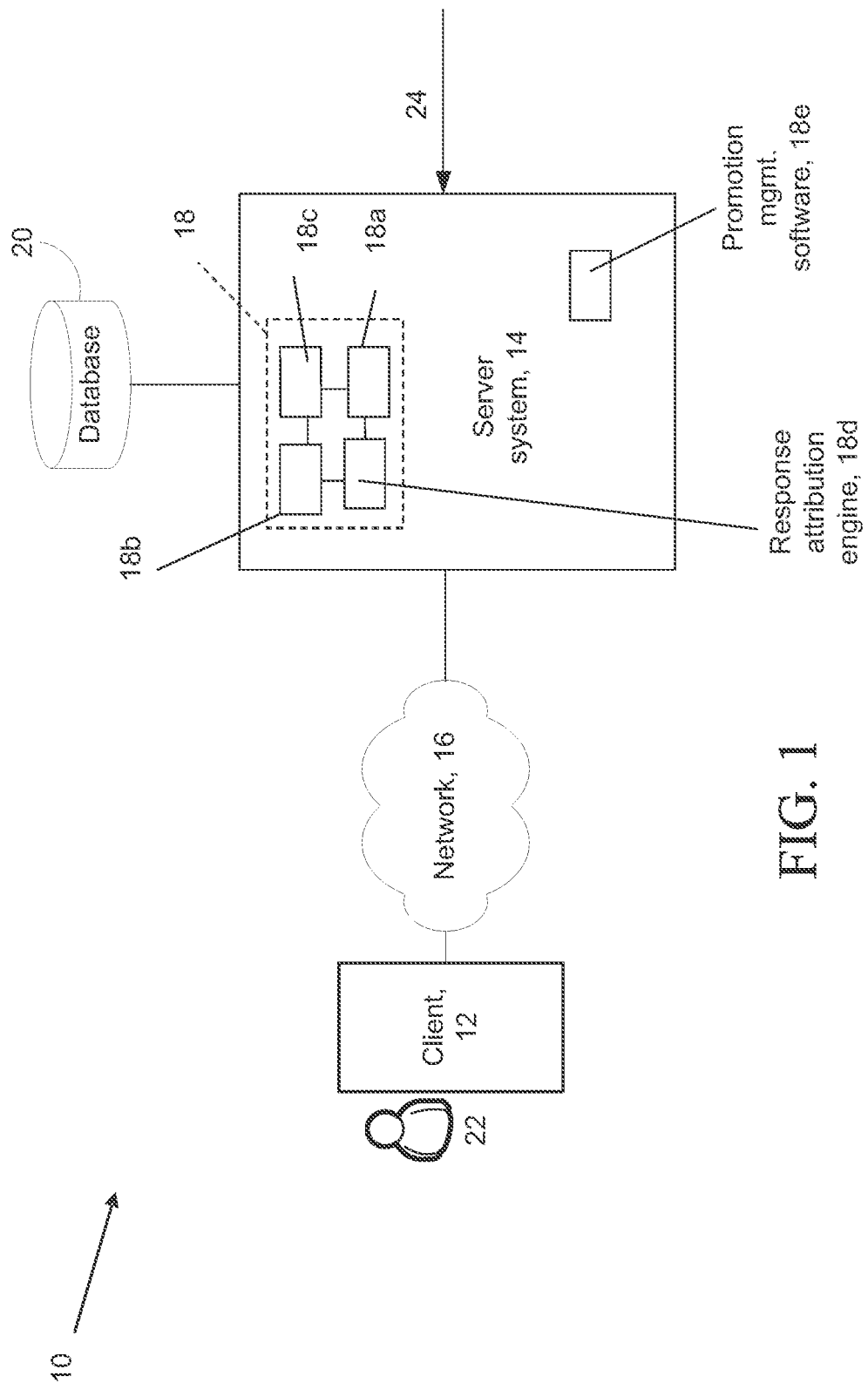
FIG. 1 is a block diagram of a computer system executing response attribution software.

Referring to FIG. 1, a system 10 for generating response attribution values includes a client system 12 that accesses a server system 14. The client system 12 includes a processor, memory and a storage device, e.g., a client workstation or a personal computer (all not shown) that can include a client process for sending responses (e.g., to a promotion) through a network 16 to the server system 14. Client system 12 includes any combination of, e.g., personal digital assistants, cell phones, mobile devices, computer systems, and so forth. The client system 12 is connected to the server system 14 through the network 16 (e.g., the Internet, a wide area network ("WAN") network, a Internet Protocol (IP) network, and a non-IP network).

The server system 14 is comprised of one or preferably a plurality of server computers generally denoted as 18 including a processor 18a, main memory 18b, and storage 18c. A response attribution engine 18d that is part of the server 18 is also shown. The response attribution engine 18d generates response attribution values based on responses 24 received from recipients 22 of a communication such as an offer retrieved from one or more databases 20. One or more of the server systems 14 also execute software for promotion management 18e. The promotion management software 18e generates promotions to send to recipients 22, such as through the clients 12 or through other channels. The server system 14 accesses one or more databases 20, which store database records of promotion information associated with a consumer.

Figure 2:
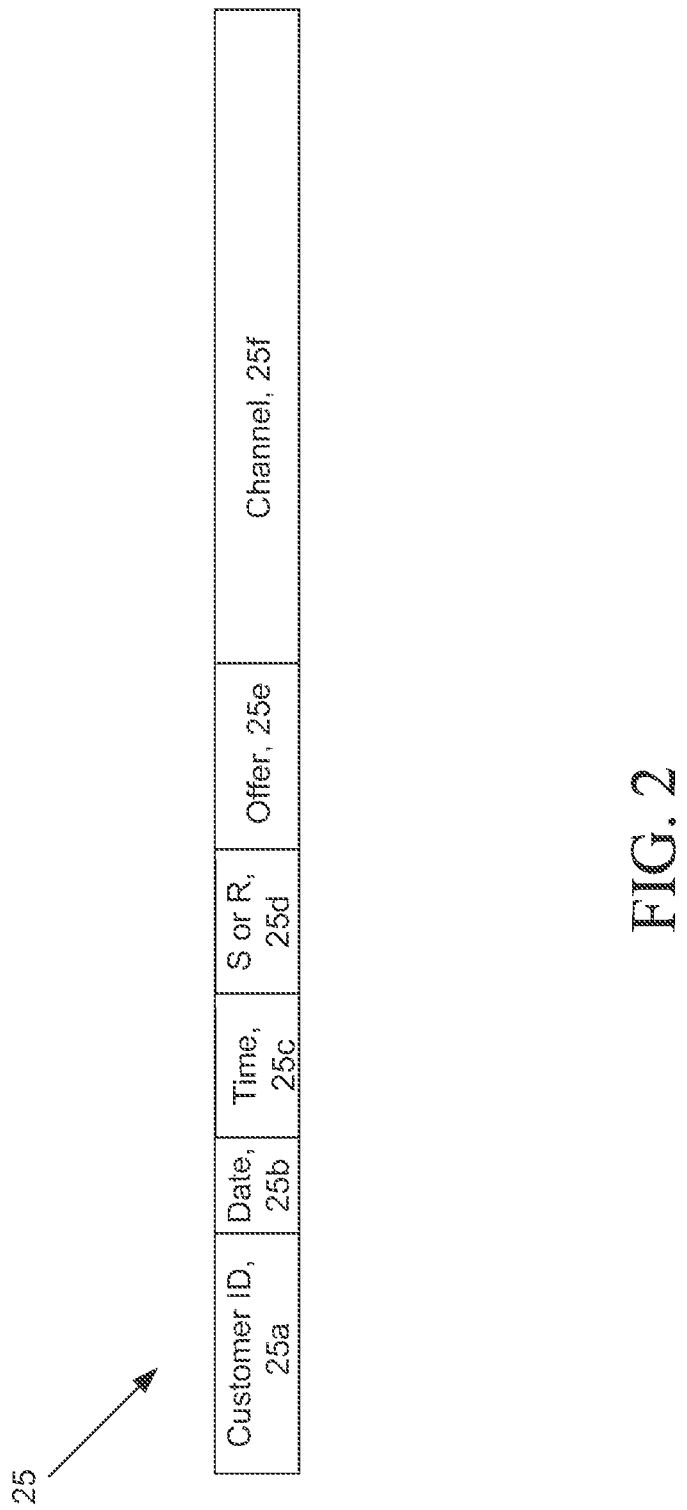
FIG. 2 is a diagram of a database record.

Referring to FIG. 2, a database record 25 from database 20 is shown. The database record 25 includes customer ID information 25a, date information 25b, time information 25c, stimulus and response information 25d, offer information 25e, channel information 25f and so forth.

The system 14 queries the database records 25 in database 20 for a list of responses ($R_1 \ldots R_i$) and stimuli ($S_1 \ldots S_j$) associated with a consumer. A promotion, such as an offer or more generally any communication and/or events (e.g., birthdays and anniversaries, elections, snowstorms, and so forth), that may lead to a response is referred to as a "stimulus." Information about stimulus $S_i$ may include customer identification ("ID") information, contact date information, channel information, product and offer information, and discount information. Information about response $R_i$ may include customer ID information, response date information, stock keeping unit ("SKU") number information, information regarding coupons and/or discounts used by the consumer, demographics information, and information regarding stimuli to be credited for a response.

The system 14 receives an unassociated list of stimuli and responses for a customer, for example, $S_1 \, S_2 \, S_3 \, R_1 \, R_2 \, S_4 \, S_5 \, R_3 \, S_6$. To determine the amount each stimulus $S_1$-$S_6$ contributed (if at all) to the responses $R_1$-$R_3$, the response attribution engine 18d calculates a response attribution value (i.e., a value indicative of the likelihood that stimulus S caused response R). The response attribution values represent a credit assignment to a stimuli, for an associated response from a recipient (e.g., during a marketing campaign). A stimulus, with an associated response from a recipient for that stimulus, is represented as a stimulus-response ("S-R") pair. An example of the S-R pairs for stimuli $S_1$-$S_6$ and responses $R_1$-$R_3$ is provided below in Table 1.

TABLE 1

{S1, R1}, {S1, R2}, {S1, R3}
{S2, R1}, {S2, R2}, {S2, R3}
{S3, R1}, {S3, R2}, {S3, R3}
{S4, R1}, {S4, R2}, {S4, R3}
{S5, R1}, {S5, R2}, {S5, R3}
{S6, R1}, {S6, R2}, {S6, R3}

The system 14 "scores" the S-R pairs to generate response attribution values for each S-R pair. For a direct response R, (the response R includes information as to which stimuli to credit, e.g., the customer filled out a card specifying which communication(s) caused the consumer to respond to the communication, the customer uses a coupon associated with stimulus S, a response is electronically captured through an email "click-through" link, and so forth, the system 14 generates a response attribution value indicative of the amount of credit attributed to stimulus S for response R.

However, where response R represents an inferred response, the system 14 executes two models. A first model is a response rate model and a second model is a time model (e.g., a time delay model), to generate a response attribution value for stimulus S, associated with response R. The response attribution value is calculated based on an output of the first model, an output of the second model, or any combination thereof.

The first model rates the compatibility between a stimulus (e.g., stimulus $S_i$) and a response (e.g., response R) to attribute a "response rate" to each S-R pair. For the first model, inputs include customer attributes (gender, age, income, etc.), channel information, stimulus information (discount, product, etc.), and response information.

To execute the first model and assign a response attribution value to the S-R pairs, the system determines the stimuli that may have contributed to response R. The system 14 accesses from database 20 one or more database records 25 (FIG. 2) of customer information associated with stimuli S that were sent to customers at a time prior to response R. The system 14 queries the database 20 for customer records including stimuli whose timing (e.g., the date and time a promotion was sent to a consumer) occurred before the time a particular response R was received by the system 14. The length of the time window is configurable by the users 22 of the system 14. Typically, the further back in time a particular stimulus S appeared before a particular response R was received, the less likely it is that the particular stimulus S contributed to the particular response R.

In some implementations, the first model is a composite of multiple models. For example, if there are one-hundred types of responses, the system 14 generates one-hundred models (one model for each type of response). The first model selects one of the one-hundred models, based on the type of response. Additionally, multiple models are generated based on the inputs (e.g., customer segments, channels, and so forth) to the first model.

In addition to calculating a probability of response, the first model is also based on various techniques for modeling responses for a marketing campaign. For example, the first model is based on the ratio $\Sigma$ Credit/$\Sigma$ S, i.e., the total credit received by stimulus S divided by the total number of presentations of S. The system 14 computes this ratio for each type of stimulus S. The ratio $\Sigma$ Credit/$\Sigma$ S accounts for the scenario where a stimulus causes multiple responses. For example, a customer receives stimulus S and the system 14 receives two responses, $R_1$ and $R_2$. A credit of one is assigned to $R_1$ and a credit of one is also assigned to $R_2$. The value of the ratio $\Sigma$ Credit/$\Sigma$ S is 2, or 2/1, representative of an expected number of responses.

The first model is also based on a user definition of a response for a stimulus. For example, based on a coupon that provides a 20% discount on electronics purchases, a user defines a response as being an electronics purchase. In this example, the system 14 uses the user's definition to rate compatibility between a stimulus and a response (i.e., if the response is an electronics purchase, the system 14 attributes the response to the appropriate stimulus, i.e., the coupon that provides a 20% discount on electronics purchases).

The second model is a time model that weights the output of the first model based on the amount of time (e.g., time delay) between the stimulus and the response. By weighting the output of the first model based on the amount of time delay between the stimulus and the response, the second model scales the response rate based on a time delay probability density function. The inputs to the second model include the generated response attribution values and sample time delays. The output of the second model is one or more time delay parameters associated with a time delay distribution (e.g., power law parameters for a power law distribution).

Here we model human response times to stimuli according to a mathematical relationship between two quantities and/or a time delay distribution, including, e.g., a polynomial relationship that exhibits a property of scale invariance, a power law distribution, a log-normal distribution, and so forth (collectively referred to herein as a "distribution," without limitation, and for purposes of convenience). The examples included herein are with regard to a power law distribution, and therefore refer to power law parameters. However, the techniques disclosed are generally applicable to various distributions. In an example, the techniques described herein may be implemented using a time delay distribution parameter other than a power law parameter.

Recent research has shown that human response times often follow a power law distribution, even across widely varying time scales (e.g. see Anders Johansen, 2004, "Probing Human Response Times", *Physica A* 338:286-291). The power law distribution indicates that the system 14 receives more responses to stimuli shortly after the stimuli are sent to consumers and that the system 14 receives fewer responses to stimuli as the time from when the stimuli were sent increases. The system 14 uses the power law distribution in determining a likelihood that a stimulus caused a response based on the time delay between response R and stimulus S in an S-R pair.

Power law data is described by the complementary cumulative distribution function $Pr[X>x]=(x/k)^{-\alpha}$ and by the probability density function $f(x)=\alpha k^{\alpha} x^{-\alpha-1}$, where k and $\alpha$ are the power law parameters of the distribution. The power law parameter of k represents a minimum amount of time before a response is received. The power law parameter of $\alpha$ influences the rate at which responses are received as a function of time.

Figure 3:
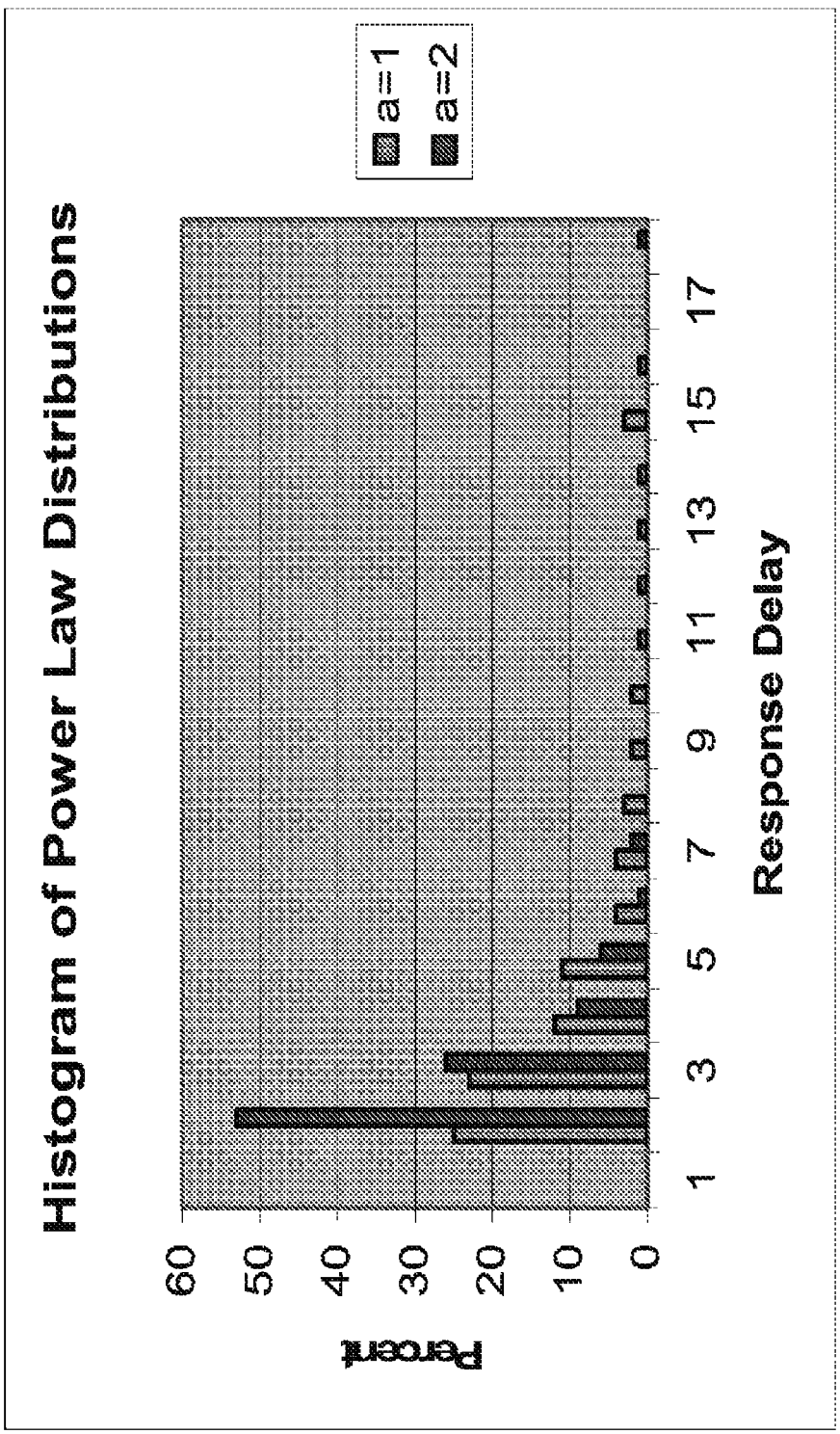
FIG. 3 is a histogram plot of percent responses received vs. time.

Referring to FIG. 3, the results of a response-stimuli simulation are shown. In the response-stimuli simulation, the response delays of sending a stimulus to one-hundred random customers (represented in the simulation by one-hundred random numerical values) were simulated using the power law distribution. The resulting graph looks like an exponential decay, except that it has a very long tail. For $\alpha=1$, the longest response delay was 432.68 days (or another time unit). For $\alpha=2$ (representing a faster response rate than $\alpha=1$), the longest response delay was 29.42 days. Neither of these response delay values is shown in the FIG. 3.

As illustrated in FIG. 3, many responses are received relatively quickly after the stimuli are sent, with fewer responses being received as the time from which the stimuli were sent increases.

The output from the first model is multiplied by the output from the second model to compute a score indicative of a likelihood that stimulus $S_i$ caused response R. The scores are normalized across the S-R pairs and a credit (e.g., response attribution value) is computed for each stimulus.

Before the system 14 executes the response rate model and the time delay model, the system 14 trains (e.g., iteratively) the models to determine values for response rate parameters associated with the response rate model and time delay parameters (e.g., power law parameters) associated with the time delay model.

Figure 4:
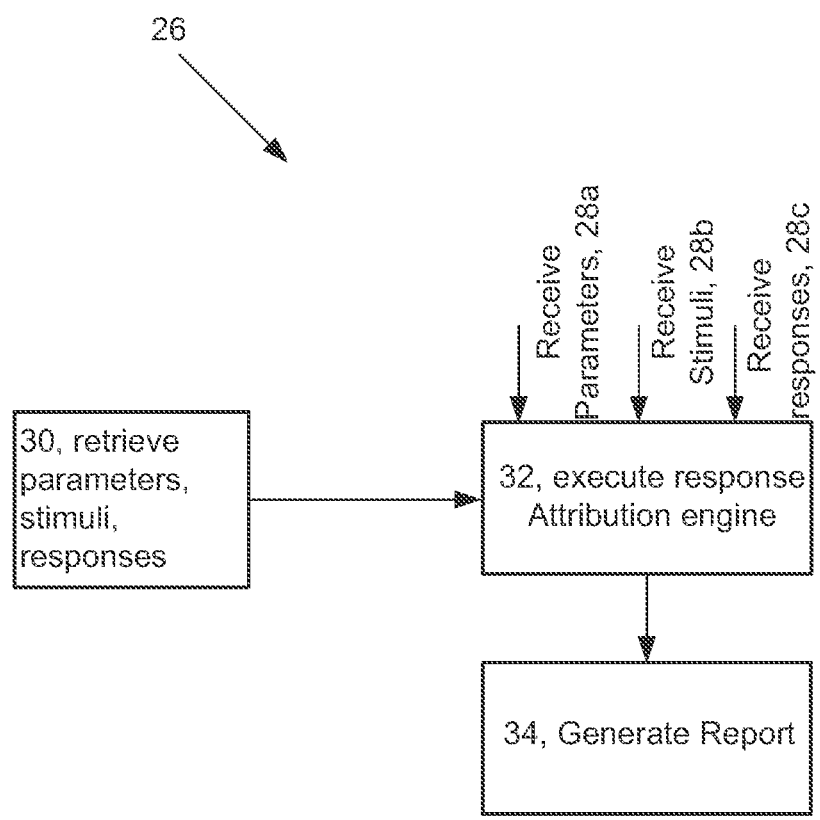
FIGS. 4-5 are flowcharts of processes used by the system.

Referring to FIG. 4, the system 14 trains 26 the models as follows. The system 14 receives 28a, 28b, 28c parameter values (e.g., values for response rate parameters and power law parameters), stimuli information, response information and other information included in database record 25, from the database 20, the client 12 and other sources and repositories 24. Additionally, the system 14 retrieves 30 parameter values, stimuli information, and response information from the database 20.

The initial values of the response rate parameters and power law parameters are arbitrarily provided by the system 14 for an initial pass through the algorithm. Initial estimates for the response rate parameters might be based on the overall number of responses divided by the overall number of stimuli. Alternatively, the initial values of the response rate parameters and power law parameters might be based on values derived from direct response attribution values or from previous runs on similar data. Based on the received and retrieved values and information, the system 14 executes 32 the response attribution engine 18d to generate response attribution values and to generate values for response rate parameters and power law parameters. The response attribution engine 18d iteratively generates improved values for response rate parameters and power law parameters through the application of an expectation maximization ("E-M") algorithm, discussed in FIG. 5. The system 14 generates 34 a report including information indicative of the response attribution value associated with stimulus $S_i$ for an associated response R.

Figure 5:
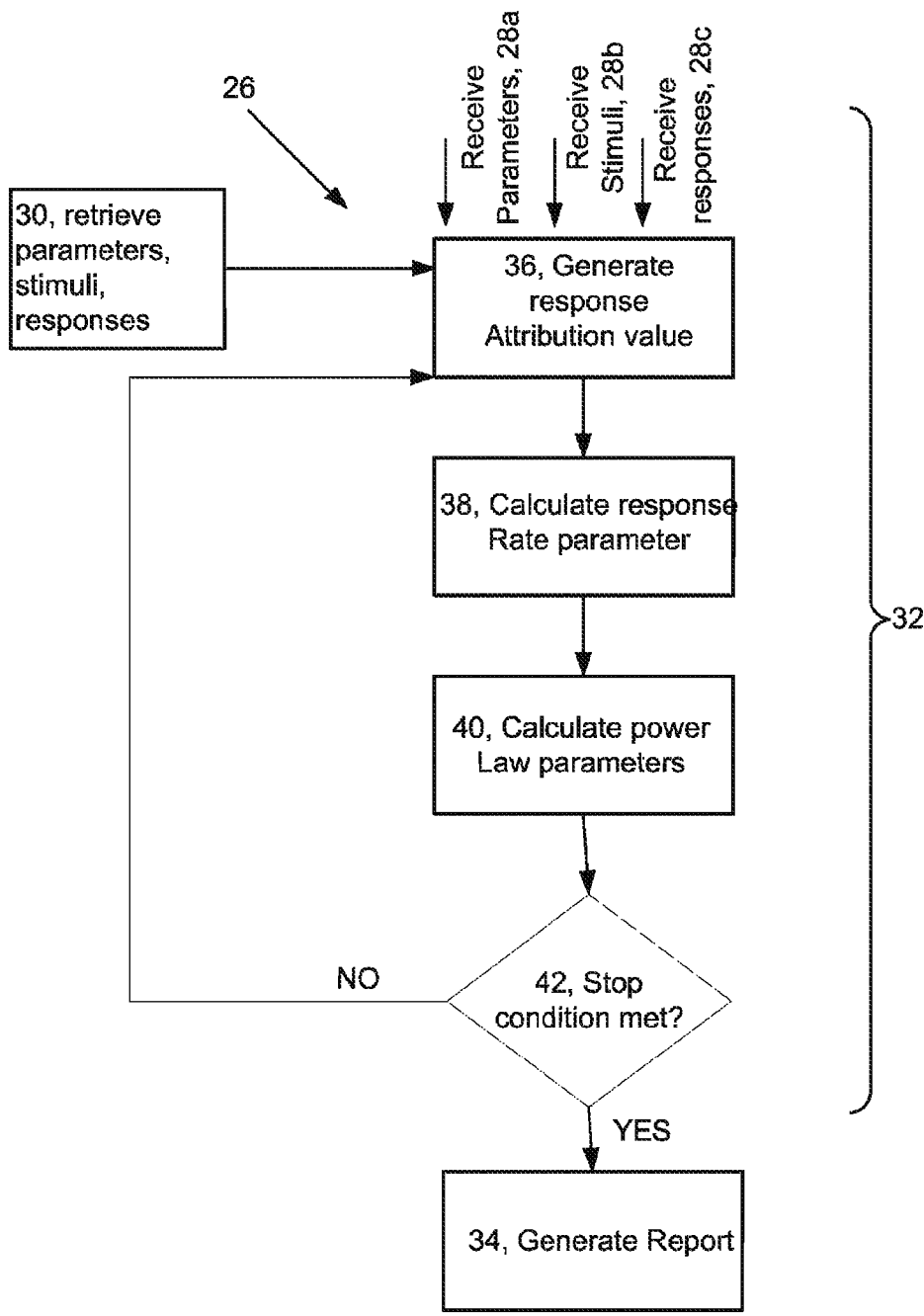

Referring to FIG. 5, application of the E-M algorithm (generally 32) has the system 14 training 26 the models and determining 42 whether a stop criteria has been met as follows.

The system 14 receives 28a, 28b, 28c parameter values (e.g., values for response rate parameters and power law parameters), stimuli information, response information and other information included in database record 25, from the database 20, the client 12 and other sources and repositories 24. Additionally, the system 14 retrieves 30 parameter values, stimuli information, and response information from the database 20.

Based on the received and retrieved values and information, the system 14 generates 36 response attribution values, as addressed in further detail below, to assign credit to the stimuli. Using the credit assigned to each stimulus, the system 14 calculates 38 a subsequent value for the response rate parameter of the response rate model, as addressed in further detail below. Using the credit as a weight for each stimulus in a regression, the system 14 calculates 40 a subsequent value for the power law parameters of the time delay model, as addressed in further detail below. Generally, a regression includes a relationship between two variables using data points. In an example, a regression includes fitting a curve to data points. Types of regressions may include weighted regressions, linear regressions, quadratic regressions, polynomial regressions, spline function models, sinusoid models, and so forth. Any of such regression models can be used.

The system 14 determines 42 if a stop condition has been met. The stop condition can be any of several criteria such as a determination of convergence of the calculated values of the response rate and power law parameters, a determination that a threshold number of iterations of calculating values for the response rate and power law parameters has occurred, and a determination that a threshold amount of computing resources have been expended by the system 14, and so forth.

If the stop condition has been met, the system 14 generates 34 a report including information indicative of the response attribution value for a stimulus and an associated response. If the stop condition has not been met, the system iteratively repeats processes 36, 38 and 40 until the stop condition occurs.

The system 14 calculates 36 the response attribution value for each stimulus $S_i$ associated with a response R for a customer (e.g., as indicated by an S-R pair). For each stimulus $S_i$ occurring at a time prior to response R, the system 14 calculates a raw score, $raw_{sr}$, as a function of the response rate model (i.e., the response rate parameter, $r_o$, where "o" represents an offer) and the time delay model (i.e., the time delay parameters, $\alpha_c$ and $k_c$, where "c" represents a channel, and a time delay between stimulus $S_i$ and response R, $delay_{sr}$.) The raw score is associated with an S-R pair and is normalized across the stimuli to generate 36 a response attribution value for the S-R pair.

Pseudo-code corresponding to the foregoing processes of calculating 36 the response attribution value is included in Table 2.

TABLE 2

For each customer {
  For each R {
    For each S prior in time to R {
      Let o = offer (s)
      Let c = channel (s)
      Let $delay_{SR}$ = time (r) − time (s)
      $raw_{SR} = r_o * \alpha_c * k_c^{\alpha_c} * delay_{SR}^{-\alpha_c - 1}$
    }

$credit_{sr} = \dfrac{raw_{SR}}{\sum_S raw_{SR}}$

}
}

The response attribution value is based on a ratio that accounts for the scenario of multiple stimuli and the scenario where a single stimulus causes multiple responses. For example, two stimuli, $S_1$ and $S_2$, are associated with a response R. The system 14 executes the response rate model to calculate that, for $S_1$, $raw_{s1r}$=1.0. The system 14 executes the response rate model to calculate that for, $S_2$, $raw_{s2r}$=0.5. The response rate model normalizes the $raw_{s1r}$ and $raw_{s2r}$ scores to calculate 36 the response attribution values, $credit_{s1r}$ and $credit_{s2r}$, for $S_1$ and $S_2$. $Credit_{s1r}$ equals 1/1.5, or 2/3. $Credit_{s2r}$ equals 0.5/1.5, or 1/3. By normalizing the $raw_{s1r}$ and the $raw_{s2r}$ scores, the summation of the values for $credit_{s1r}$ and $credit_{s2r}$ equals 1, representing that the total credit across all stimuli associated with response R has a value of 1.

Weight values are associated with the response rate model and the time delay model. The weight values are determined by the system 14 based on predicted reliability of the response rate model and the time delay model. For example, assume that the system 14 determines that the time delay model is twice as accurate at predicting the response attribution value as the response rate model is at predicting the response attribution value. In this case, the system 14 associates the response rate model with a weight value of 0.5, indicating that the response weight value receives half as much weight in calculating the response attribution value as the time delay model.

The system 14 calculates 38 a subsequent value for the response rate parameter based on the calculated response attribution value calculated 36 by the system 14. For each offer or category of stimulus the system 14 initializes two values, value1 and value2, to zero. Value1 is indicative of an amount of credit assigned to all stimuli from offer or category o across all responses for all customers. Value2 is indicative of the number of times stimuli from offer or category "o" are present across all customers. For each stimulus with offer or category o, the system 14 increments value2 by one, reflecting the association of stimulus $S_i$ with the offer or category. Additionally, for each response R associated with a stimulus from offer or category o, value1 is incremented by the response attribution value associated with the stimulus-response pair. The system 14 calculates 38 a subsequent value for the response rate parameter by dividing value1 by value2.

Pseudo-code corresponding to the foregoing processes of calculating 38 a subsequent value for the response rate parameter is included in Table 3.

TABLE 3

For each offer o {
  $Value1_o$ = zero
  $Value2_o$ = zero
  for each S where offer(S) = o {
    $Value2_o = Value2_o + 1$
    for each R for which S has credit {
      $Value1_o = Value1_o + credit_{SR}$
    }
  }

$r_o = \dfrac{Value1_o}{Value2_o}$

}

The system 14 calculates 40 a subsequent value for the power law parameters, $\alpha$ and k, by applying the generated response attribution value and the time delay distribution to a regression model. Subsequent values for $\alpha$ and k are computed based on the marketing channel used in the marketing campaign associated with the stimuli. Subsequent values for α and k are also computed based on promotion offers and other attributes of a marketing campaign. Whatever factors might affect the response delay distribution may be taken into consideration when determining how many sets of parameters should be computed. Typically, different channels will have different delay characteristics, and so different parameters are learned for each channel. For example, email typically has shorter delays than snail-mail. Other factors that affect response delays could include the type of offer or customer demographics. For each channel "c" in a marketing campaign, and for each "S-R" pair where the stimulus is associated with channel c and stimulus S receives some credit for response R, "x" and "y" values for a regression are computed. The x value represents the natural log of the time delay between response R and stimulus S in the S-R pair. The y value represents the natural log of a complementary cumulative distribution function ("CCDF"). The y value equals ("Pr[X>x]"), the probability that a random value time delay (i.e., "X") is greater than the measured time delay (i.e., "x") between response R and stimulus S in a particular S-R pair. The probability that a random value time delay is greater than the time delay between response R and stimulus S takes into consideration the response attribution value associated with the S-R pair. Additionally, a weight value is set to equal the response attribution value for the S-R pair. The response attribution engine 18d executes a regression against a vector of x values, a vector of y values, and a vector of the associated weight values.

Figure 6:
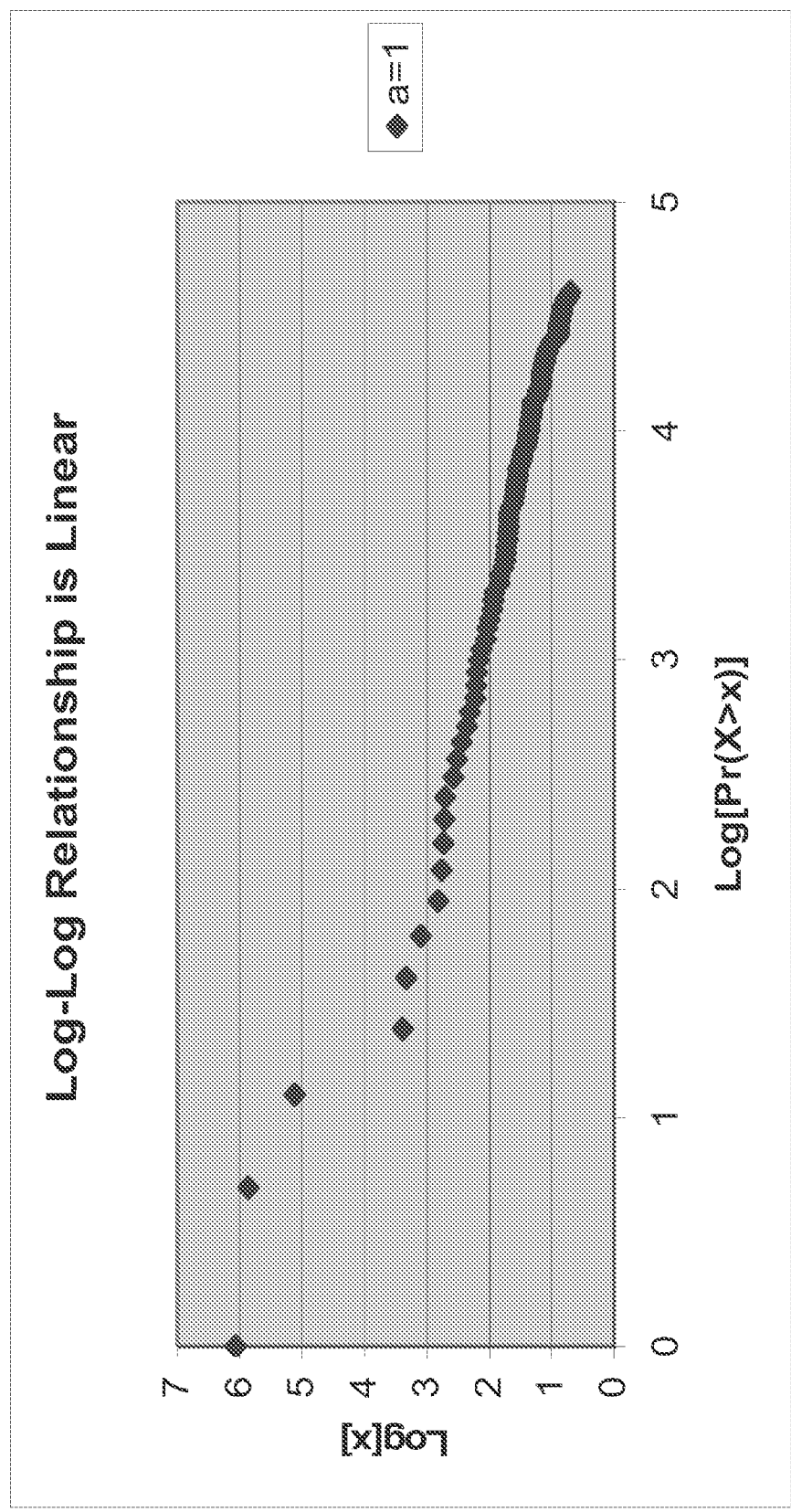
FIG. 6 is a log-log plot of the complementary cumulative distribution function of a power law distribution.

As illustrated in FIG. 6, in a power law distribution, the log-log plot of Pr[X>x] approximates a straight line, because ln(Pr[X>x])=−α (ln x−ln k). In some examples, numerous power law distributions are superimposed on each other. By fitting a line to the log-log plot(s) of Pr[X>x], the system 14 determines the line's slope and intercept values. The system 14 calculates 40 a subsequent value of the power law parameter a based on the slope value of the line. The system 14 calculates 40 a subsequent value of the power law parameter k based on the slope and the intercept values of the line.

Pseudo-code corresponding to the foregoing processes of calculating 40 the subsequent values of the power law parameters is included in Table 4.

TABLE 4 for each channel c {
  for each SR pair where channel(S) = c and S receives some credit for R {
    Let $X_{SR}$ = ln [delay$_{SR}$]
    Let $Y_{SR}$ = ln [prob [delay > delay$_{SR}$]], taking into consideration the
    weight of each observation
    Let weight$_{SR}$ = credit$_{SR}$
  }
  Run linear weighted regression with inputs:

$\overrightarrow{X}$, $\overrightarrow{Y}$, $\overrightarrow{Weights}$, yielding slope and intercept $\alpha_c$ = −slope
  $k_c = e^{(intercept/-slope)}$
}

Based on the system's iterative execution of processes 36, 38 and 40, the accuracy of the values for the response rate and the power law parameters tend to improve, causing a concomitant improvement in the weights (i.e., the credit values, credit$_{SR}$) assigned to the stimuli, causing a virtuous cycle of improvement.

In one example, one hundred customers receive two different stimuli in chronological order, $S_1$ and $S_2$, three days apart. The stimuli come from two different time delay distributions. If a response R occurs in time before $S_2$ is sent, the stimulus $S_1$ receives full credit for the response R. Otherwise the system must determine what credit should accrue to each of the two stimuli. Arbitrary initial values are assigned to the power law parameters. The system 14 executes 36 the response attribution engine 18d to determine response attribution values, based on the initial values for the power law parameters. The response attribution engine 18d executes 32 the E-M algorithm to generate subsequent values for the power law parameters. The response attribution engine 18d continues to execute 32 the E-M algorithm until the values of the power law parameters converge.

Figure 7:
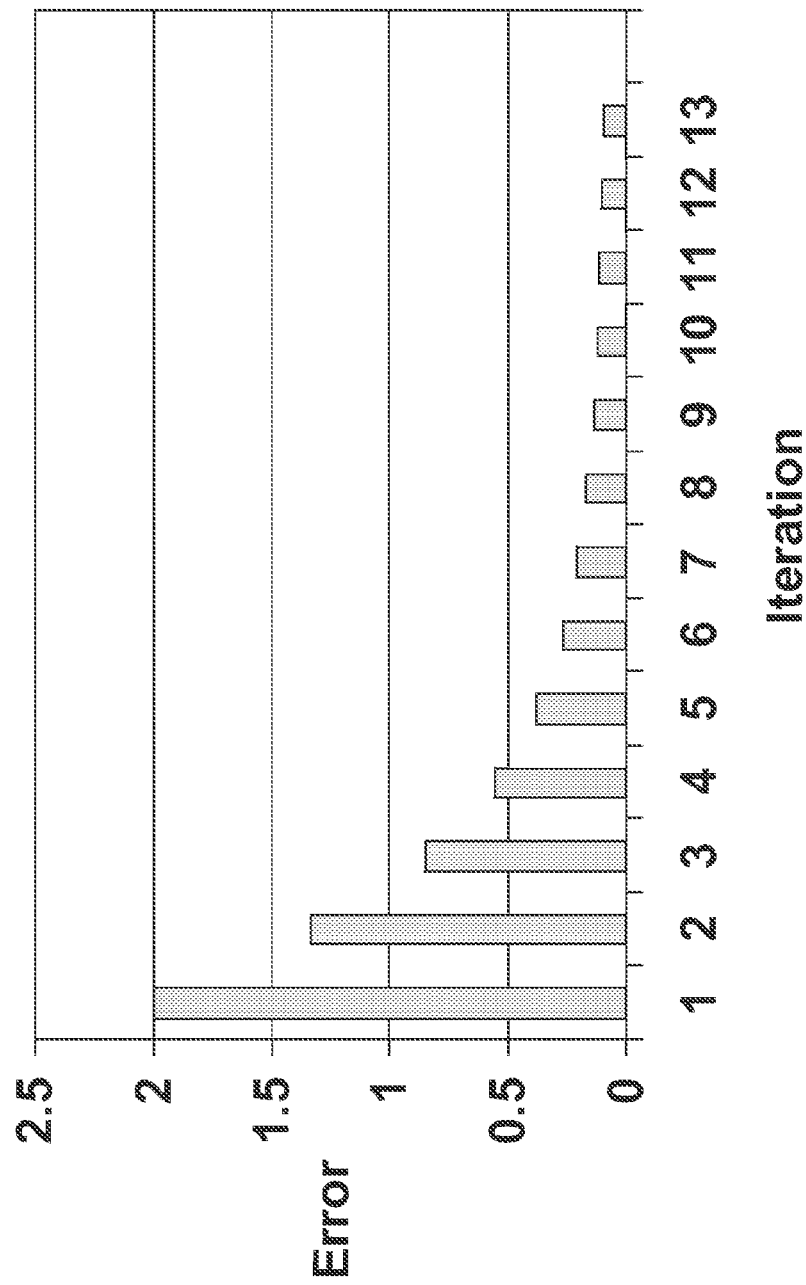
FIG. 7 is a plot of parameter convergence.

As shown in FIG. 7, through the response attribution engine's execution of the E-M algorithm, the amount of error in the calculated values for one of the power law parameters for $S_2$ decreases from 2.0 to 0.091051 over the course of about thirty iterations of the E-M algorithm. The error decreases similarly for the other parameters.

In one particular example, through the promotion management software 18e, the server system 14 sends ten different stimuli ($S_1$-$S_{10}$) to 10,000 customers 22. The response rates for $S_1$-$S_{10}$ range from 3% to 30%, with $S_1$ having a response rate of 3% and $S_{10}$ having a response rate of 30%. Stimuli $S_1$-$S_{10}$ are sent to customers 22 over two promotion channels, $c_1$-$c_2$. The system 14 initializes the response rate parameters of $S_1$-$S_{10}$ to range from 3% to 30%, with S10 having a response rate of 3% and $S_1$ having a response rate of 30%. The system executes processes 36, 38 and 40 until the response rate and power law parameters converge at values indicative of the true response rate of $S_1$-$S_{10}$. At convergence, the system 14 calculates response attribution values that accurately represent the response rates of 3% to 30% associated with stimuli $S_1$-$S_{10}$ over channels $c_1$-$c_2$.

In another example, direct responses (e.g., from click-through links displayed on a graphical user interface) are used by the system 14 in calculating response attribution values. A consumer receives "click-through" stimuli $S_1$, $S_2$ and $S_3$. The consumer clicks through on $S_3$. The response attribution engine 18d apportions credit between $S_1$, $S_2$ and $S_3$. A user of the system 10 specifies a weight for the direct portion (i.e., the click through on $S_3$) of credit (e.g., 70% credit is attributed to $S_3$). Using the techniques described herein, the response attribution engine 18d apportions the remaining 30% of credit between $S_1$ and $S_2$ through the generation 32 of response attribution values for $S_1$ and $S_2$.

Predictive modeling techniques generally do not attempt to assign credit to and among promotions (e.g., communications) that may have precipitated a particular response from a recipient (e.g., a customer), whereas direct response attribution fails to provide a measure of "inferred response attribution," an attribution of credit to a promotion for a response, when the entity responding to the promotion does not provide unique information identifying the promotion to which the entity is responding. Moreover known response attribution techniques generally do not provide data-driven crediting to multiple promotions (fractional/partial credit). Typically such techniques provide an all-or-nothing credit to the first or last promotion or simple "equal" credit across all promotions.

A great deal of complexity exists in marketing today, with companies attempting to "dialog" with their customers on many channels using multiple "communications," over a period of time. Communications with customers may be initiated in either direction (inbound or outbound), and there may be a large variety and number of communications e.g., those types that are direct communications, e.g., that target a particular individual) and those that are indirect e.g., such as mass marketing mailings.

Marketing organizations typically receive a combination of both "direct" and "inferred" responses, though some companies only have inferred responses. Direct response attribution is typically straight-forward, but may represent a small percentage of the responses. Measuring "inferred" response behaviors is highly complex, especially when multiple communications may contribute to the response behavior.

Leveraging the direct response information, when it is available, is a very powerful technique for accurate crediting of inferred responses. Even when direct responses (from click-throughs for example) are received, there is additional value in inferring additional credit (e.g., for the stimuli that did not directly cause the response). For example, a customer receives stimuli A, B, and C (e.g., web "click-through" links), and clicks through on C. In this example, stimuli A and B may also deserve some portion of the credit for the click-through response.

Another example where it is valuable to share credit between stimuli is when a pay-per-click (PPC) keyword search brings a visitor to a website, but personalized online marketing messages and/or offers contribute to the response (e.g., conversion/purchase). The PPC and subsequently shown marketing messages and/or offers share the credit and subsequent return on investment ("ROI") associated with the conversion event.

As described above, many companies use predictive modeling (e.g., response models, valuation models) to forecast customer responses given some prior communication. Another important problem is to look in the other direction: given a customer response, which earlier communication(s) helped to precipitate this outcome? How should "credit" be attributed (or apportioned) to those various communications? Which communication(s) might generate the behavior by themselves vs. in conjunction with other communications? This is the problem of response attribution.

Response attribution is a difficult problem for many reasons, including that the prior communications with a customer may not be accurately known. For example, if a marketing message was sent out over a broadcast type medium (e.g., a radio or a TV), it may not be known with certainty whether the marketing message reached a particular individual. Another reason for the difficulty of the problem is that the timing of communications and response behavior may vary drastically (e.g., when an individual opens and reads an email or when a specific customer responds to a previous communication). In addition, there are often many different communications, delivered on multiple channels, at different times, each soliciting the same or similar behavior (or even just creating a "brand" impression) which could have had an impact on a response.

Accurate response attribution is of particular importance in that it provides actionable intelligence. Correct apportionment of credit among stimuli allows marketers to accurately evaluate the performance of specific marketing promotions and their interactions with other promotions. Based on response attribution, marketers can optimize allocation of their marketing resources into the communication strategies with the highest ROI.

Embodiments can be implemented in digital electronic circuitry, or in computer hardware, firmware, software, or in combinations thereof. Apparatus of the invention can be implemented in a computer program product tangibly embodied or stored in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method use the "World Wide Web" (Web or WWW), which is that collection of servers on the Internet that utilize the Hypertext Transfer Protocol (HTTP). HTTP is a known application protocol that provides users access to resources, which may be information in different formats such as text, graphics, images, sound, video, Hypertext Markup Language (HTML), as well as programs. Upon specification of a link by the user, the client computer makes a TCP/IP request to a Web server and receives information, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Sun, Linux, and Macintosh may also be used. Computer users can view information available on servers or networks on the Web through the use of browsing software, such as Netscape Navigator, Microsoft Internet Explorer, Mosaic, or Lynx browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description and the claims. For example, due to the nature of software, functions described above can be implemented using software, hardware or firmware or combinations thereof. Features implementing functions may also be physically located at various positions, including being distributed such that portions of functions are implemented at different physical locations.

In another example, the response rate model is based on a neural net model, in which a credit assignment is used as a target output for the model. With a neural net response rate model, the model is trained for convergence on each E-M step.

In yet another example, the response attribution value is calculated as a function of the response rates $r_i$ and the time densities $t_i$ for all the stimuli, where $R_i=r_i/\text{SUM } r_i$ and $T_i=t_i/\text{SUM } t_i$. In this example, the $R_i$ value and the $T_i$ value are between zero and one. The convex sum of the $R_i$ value and the $T_i$ value is calculated as follows: $p_i=a*R_i+(1-a)*T_i$. In this example, "a" is a variable for a weight value assigned to the response rate versus the time delay density.

It will be understood that various modifications may be made without departing from the spirit and scope of the application.

What is claimed is:

1. A computer-implemented method, comprising:
generating, using a computer hardware system, a set of stimulus-response pairs by pairing each individual stimuli from a plurality of stimulus with each individual response from a plurality of response; and
calculating, using the computer hardware system and for each pair in the set of stimulus-response pairs, a response attribution value, wherein
the response attribution value is based upon a combination of a first model and a second model,
the first model is a response rate model, and
the second model is a time delay model that weights output of the first model based on an amount of time delay between a stimuli and a response.

2. The method of claim 1, wherein
the response attribution value represents a likelihood that the stimuli caused the response.

3. The method of claim 1, wherein
the first model is automatically selected, for a particular stimulus-response pair, from a plurality of first models based upon a type of response in the particular stimulus-response pair.

4. The method of claim 1, wherein
the second model is based upon a power law distribution.

5. The method of claim 4, wherein
the first model generates a first response attribution value, and
the second model generates power law parameters using the first response attribution value from the first model.

6. The method of claim 5, wherein
the power law parameters include:
a minimum time before the response is received, and
a rate at which responses are received as a function of time.

7. The method of claim 5, wherein
the power law parameters for the stimuli are based upon a particular channel associated with the stimuli.

8. The method of claim 1, wherein
a single response causes response attribution values for multiple stimulus to receive credit.

9. The method of claim 8, wherein
the credit for the single response is differently weighted across the multiple stimulus.

10. The method of claim 1, wherein
the first model is based on a user definition of the response for the stimuli.

* * * * *